(No Model.)
H. V. DUNN.
SHEEP SHEARS.
No. 540,156. Patented May 28, 1895.
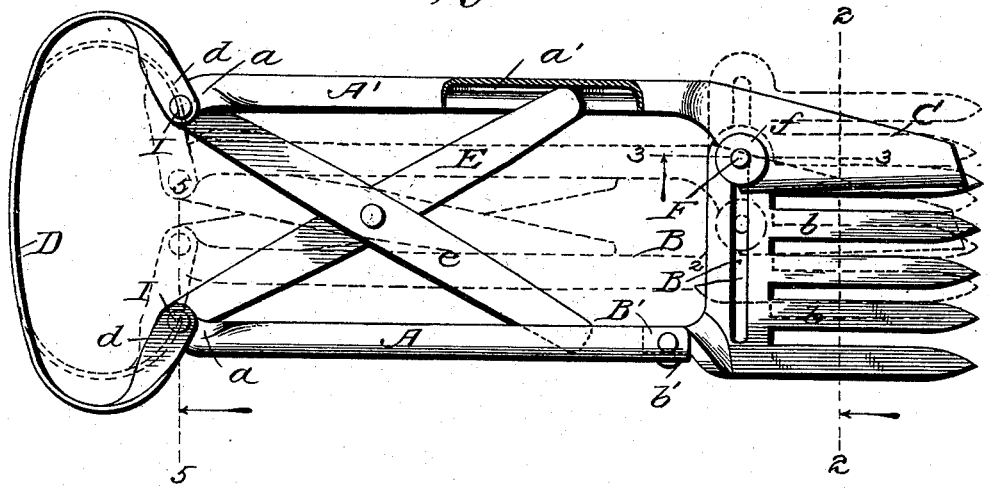
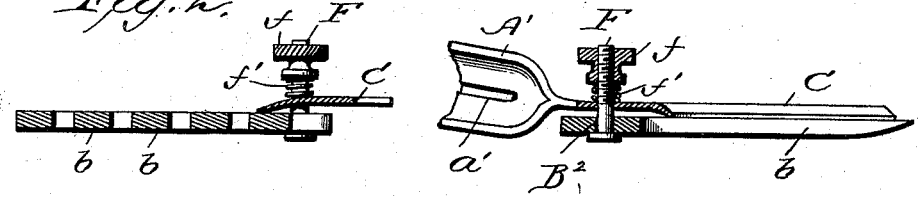
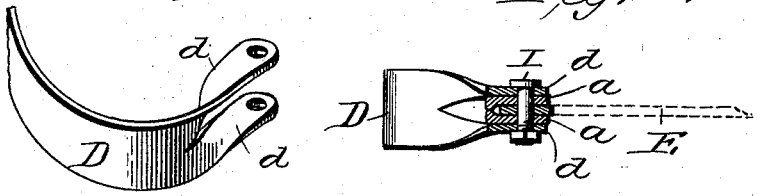
Witnesses
Inventor
Hugh V. Dunn.
By Alexander & Dowell
Attorneys

UNITED STATES PATENT OFFICE.

HUGH V. DUNN, OF HURRICANE, WEST VIRGINIA.

SHEEP-SHEARS.

SPECIFICATION forming part of Letters Patent No. 540,156, dated May 28, 1895.

Application filed September 14, 1894. Serial No. 523,003. (No model.)

*To all whom it may concern:*

Be it known that I, HUGH V. DUNN, of Hurricane, in the county of Putnam and State of West Virginia, have invented certain new and useful Improvements in Sheep-Shears; and I do hereby declare that the following is a full, clear, and exact description thereof, reference being had to the accompanying drawings, and to the letters of reference marked thereon, which form part of this specification.

This invention is an improvement in animal shears, and its objects are to cause the movable blade to move in a straight path across the stationary blade, as distinguished from a swinging movement; to have the handles always maintain a parallel position, and approach or recede from each other on parallel lines, instead of radial or converging lines, thereby rendering fully effective the grip of the entire hand in operating the shears, whereas in ordinary shears the greatest strain is put on that portion of the hand nearest the blades; also to so construct the movable blade that it will not be obstructed or displaced by contact with one tooth of the comb-blade while operating against another, and finally to provide an adjustable regulating device for keeping the movable blade in close but yielding contact with the stationary blade while the shears are being operated.

The invention therefore consists in the means for accomplishing these objects as hereinafter claimed, and the best form of shears now known to me is illustrated in the accompanying drawings and described as follows:

Figure 1 is a top plan view of the complete shears, showing the position of the movable parts at the beginning and end of a cutting stroke by the aid of dotted lines. Fig. 2 is a detail transverse section of the blades on line 2 2, Fig. 1. Fig. 3 is a detail sectional view showing the devices for regulating the shear contact of the blades on line 3 3, Fig. 1. Fig. 4 is a detail perspective view of one end of the spring detached. Fig. 5 is a transverse section of the joint between handles, spring, and X-levers on line 5 5, Fig. 1.

Referring to said drawings by letters, A, A', designate the opposite handles of the shears. On the front end of handle A is what I call the "stationary comb-blade" B, having a series of parallel straight teeth $b$, which are also substantially parallel with the handle. This comb-blade may be formed integral with or separate from the handle A, and as shown is a separate piece having a tang B' at one corner by which it is secured to the handle by screws $b'$.

On the outer end of handle A' is formed or secured the "movable" cutting blade, C, which is concaved on its under side (as shown in cross section) so that only its cutting edge will contact with the top surface of the comb-blade teeth $b$. The cutting edge of this movable blade is slightly diagonal or beveled from base to point, so that as it moves laterally over the teeth $b$ a shear cut will be made therewith, the advantages of such a cut being well understood.

The rear ends of handles A, A', are pivotally connected to the ends of a bent flat-band spring D, which tends to force the rear ends of the handles apart. The rear ends of a pair of levers E, $e$, are respectively pivoted to the rear ends of the handles, and said levers are arranged like an X, being pivoted together at their point of intersection which is at about their centers. The front end of lever E (whose rear end is pivoted to handle A) presses against the inner face of handle A' near the front end thereof while the front end of lever $e$ (pivoted to handle A') presses against the front end of handle A, and therefore as the spring separates the rear ends of handles A, A' the X-levers are simultaneously opened, and press apart the front ends of the handles, so that the latter separate on parallel lines, while without these X-levers (in the shears shown) the handles would be opened or closed on radial or converging lines. When the handles are forced together the spring is contracted and the X-levers cause the handles to approach on parallel lines, thereby moving the blade straight across the comb-teeth, so it will cut exactly alike with each. The extent of movement of the blades in relation to each other is regulated by a bolt F which plays in a transverse slot $B^2$ through the comb-blade B, behind the teeth, and passes through a perforation in the base of blade C, as shown. It will be seen that the slot $B^2$ is straight, which it could not be if the blades swung or moved on arcs of circles.

On the bolt F above blade C is a thumb nut f and interposed between this nut and the blade is a helical spring f'. By properly turning nut f the blade C will be held more or less closely against blade B, but can separate slightly therefrom in case a tooth should spring, or some unyielding substance get between the blade and teeth.

The concavity of blade C allows it to be so made or tempered that the outer portion of its edge will spring downward slightly below the top edge of the tooth with which it is about to cut, but this edge rides up on the edge of such tooth in cutting, and insures close contact between the blade and tooth during the entire cut. This slight dropping of the ou'er end of the cutting blade C is due to its shape and temper but is so slight as not to be noticeable in drawings. The base of blade C is held in contact with the blade B by spring f' and nut f. The concavity of the cutter also lessens its frictional contact with the comb-blade and prevents its edge being lifted out of contact with one tooth by the springing of the preceding tooth or obstructions thereon, and the cutter in the shears shown will cut with each blade equally well and with all precisely alike.

The front ends of the X-levers may work in guide slots or grooves a' in the handles if desired. In the shears shown the handles are made of semi-tubular steel. The rear ends are flattened down forming ears a, a, which are perforated for the passage of screws or rivets I that transfix the ends of lever E or e that lie between the ears.

The spring D has each end slit into two tongues d which are given a quarter twist so that their extremities can embrace the ears a, a, of the adjoining handle and bolts I transfix these tongues also, and therefore unite the spring, X-levers, and handles together, as shown. It may also be noted that in the shears shown, the movable blade passes from left to right, and when open is always over the sheared surface instead of being on the "wool" side.

I do not limit myself to the precise construction and arrangement of parts shown in the drawings, for producing the parallel approach or separation of the handles and blades, as modifications would be obvious to skilled persons.

Having thus described my invention, what I claim as new, and desire to secure by Letters Patent thereon, is—

1. An animal shears consisting of a pair of handles carrying cutting blades, springs for forcing said handles apart, and a pair of X-levers pivoted to each other, and secured to and between the handles whereby the handles are kept parallel when the shears are operated, substantially as described.

2. In animal shears, the combination of a pair of handles carrying cutting blades, a spring attached to the rear ends of said handles, and X-levers interposed between the handles and intermediate the spring and cutting blades whereby they are kept parallel when opening or closing, substantially as described.

3. In a shears the combination of a pair of handles, the blades carried thereby, and spring for separating the handles with the X-levers interposed between the handles the opposite levers being pivotally connected to opposite handles at one end only for the purpose and all substantially as described.

4. In a shears the combination of the handles, the X-levers therebetween, and the cutting blades, with a bolt playing in a slot in one blade and passing through a perforation in the other blade, a thumb-nut on said bolt, above the blades, and a spring interposed between said nut and blade, whereby the blades may be kept yieldingly in contact, substantially as described.

5. The combination of the handles, the comb-blade, attached to one of the handles, and the concaved blade attached to the other handle and the adjustable bolt and spring for keeping the blades in contact, reciprocating with the concaved blade, substantially as described.

6. The combination of the handle, the cutting blades, one of said blades being concaved on its inner face, a bolt transfixing the concave blade and working in a slot in the other blade, and the adjustable spring for holding the blades in contact, mounted on said bolt, substantially as described.

7. In a shears the combination of the handles and X-levers therebetween whereby they are kept parallel in opening or closing, with the comb-plate attached to one handle and the concave blade having a beveled cutting edge attached to the other handle, and means for keeping said blades in yielding contact, substantially as described.

8. The combination of the handles, the X-levers respectively connected to the rear end thereof, and the spring pivotally attached to the rear ends of the handles also, substantially as described.

9. The combination of the handles, the cutting blades, one of said blades being concaved on its inner face, and the adjustable spring for holding the blades in contact, and the X-levers E, e, interposed between and respectively connected to the handles, substantially as described.

In testimony that I claim the foregoing as my own I affix my signature in presence of two witnesses.

HUGH V. DUNN.

Witnesses:
ARTHUR E. DOWELL,
JAMES R. MANSFIELD.